(No Model.)
A. M. RANDOLPH.
PROCESS OF MAKING GRANULATED SOLDER.
No. 305,758. Patented Sept. 30, 1884.
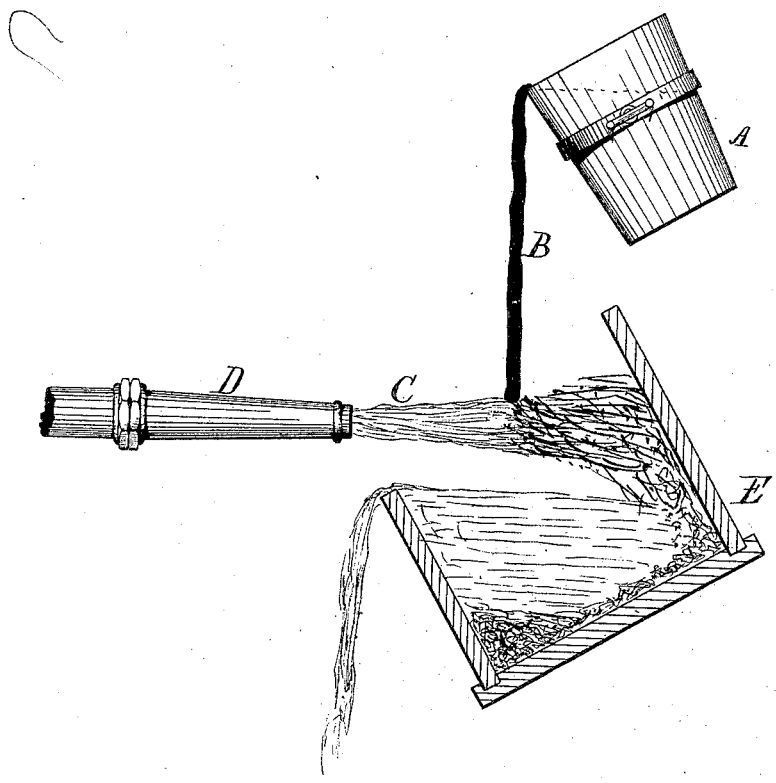
Witnesses:
Taylor E. Brown
Chas. L. Carman
Inventor:
Arthelon M. Randolph,
per Munday, Evarts and Adcock,
his Attorneys:

UNITED STATES PATENT OFFICE.

ARTHELOW M. RANDOLPH, OF BRAINERD, MINNESOTA, ASSIGNOR TO ARTHELOW M. RANDOLPH, OF SAME PLACE, AND JAMES G. BUTTERFIELD, OF SIOUX CITY, IOWA.

PROCESS OF MAKING GRANULATED SOLDER.

SPECIFICATION forming part of Letters Patent No. 305,758, dated September 30, 1884.

Application filed November 3, 1883. (No model.)

*To all whom it may concern:*

Be it known that I, ARTHELOW M. RANDOLPH, a citzen of the United States, residing in Brainerd, in the county of Crow Wing and State of Minnesota, have invented a new and useful Improvement in Processes of Making Granulated Solder, of which the following is a specification.

Heretofore the various kinds of solder used for brazing and other purposes, and consisting of various alloys of different metals, have been made or cast into bars. After the alloy has been made and cast into bars, in order to reduce the solder to the granular or powdery form necessary for use it has been customary to put the bar into a lathe or other device and turn it down into fine shavings, which are then pulverized by pounding, which is of course a somewhat slow, laborious, and expensive method. I have discovered a very simple and cheap as well as expeditious process of making the solder, and one, too, by which its quality is much improved, the solder by my process being in a measure annealed, and rendered both softer and stronger.

In my invention I project a stream of water, preferably cold, against a stream of molten alloy or solder, by which means the stream of molten solder is divided into a fine spray of very minute particles, which, cooling as they fall, may be collected in the bottom of a suitable vessel, while the water flows off over the top of the vessel.

In the accompanying drawing, which forms a part of this specification, I have shown, as illustrative of my process, a diagram or view of one way, and what I think is the best way, of practicing it.

In the drawing A represents a crucible filled with a molten alloy or solder—as, for example, sixteen parts of zinc and fifteen parts of copper; and B represents a stream of molten solder being poured therefrom by an attendant while the crucible rests upon its supports.

C is a stream of water issuing from the nozzle D, and striking the stream of solder preferably at about right angles or horizontally and with sufficient force to break the latter into a fine spray.

E represents a tub or vessel for collecting the powdered solder produced by the process. It may preferably be tipped up or inclined about as shown in the drawing, so that the water will flow off over its edge, and so that its upper inclined side will confine the spray of water and solder within the tub, and prevent its splashing out.

It will be seen, therefore, that my process may be practiced with the simplest and most inexpensive or ordinary implements.

The effect of the stream or jet of water upon the stream of molten solder is not only to break or divide it into a fine spray of very minute particles, but also in a measure to anneal the fine particles of solder, and to render the solder softer, tougher, and stronger, so that its quality is very much improved, and articles brazed or united by it will resist fracture with greater strength or tenacity.

After the crucible is emptied, the pulverized or granulated solder collected in the vessel should be taken out and dried by exposing it to heat or currents of hot air. The solder collected in the vessel will also be found to be of somewhat different degrees of fineness. As the several grades are suitable for different kinds of work—the finest grades being adapted, for example, for use of silversmiths and in fine work, while the coarser grades are desired in other kinds of work—I ordinarily screen the powdered solder after it is dried, and separate it into a number, two or more, different grades. However, by varying the relative size of the stream or jet of water and its force, the stream of solder may be broken and subdivided into a spray of any desired degree of fineness, and so as to produce a very finely-powdered solder, as may be desired. The stream of solder, for example, may be one-half inch in diameter, and the jet of water issuing from the nozzle an inch and one-eighth in diameter, and very good results will be produced.

I of course am aware that a jet striking a stream of liquid will break it into a spray, as is shown, for example, by the ordinary spraying perfumery bottles or sprinklers used by barbers, or in the atomizers so commonly used for applying disinfectants, and I make no claim to the discovery of such a principle; but I believe that I am the first to practically apply this principle to the manufacture of solder, and my invention operates, also, on a somewhat different principle, as the mere contact of the water will cause the hot and molten metal to disintegrate or fly apart.

I am aware of the Letters Patent No. 192,113, to J. R. Cooper, of June 19, 1877, wherein a stream of molten metal is poured upon an inclined plate resting in a vat of water, and wherein a stream or jet of water slightly inclined to the board is employed to sweep the thin irregular shapes, into which the metal is broken by falling upon the inclined board, therefrom and chill the same; and I hereby expressly disclaim the process described in said patent as forming no part of my invention. In my invention the jet or stream of water strikes directly against the stream of molten solder, and by its force breaks and subdivides the same into a fine spray.

I am aware of the Patent No. 65,339, granted July 4, 1867, to Butcher and Shaw, for machine for shotting metals; and I hereby disclaim the machine therein shown and described as forming no part of my invention.

What I claim is—

1. The process of manufacturing powdered solder, consisting in projecting a stream or jet of water directly against a stream of molten solder with sufficient force to break the latter into a fine spray, substantially as specified.

2. The process of manufacturing powdered solder, consisting in projecting a stream or jet of cold water directly against a stream of molten solder with sufficient force to break the latter into a fine spray, and then drying the powdered solder, substantially as specified.

ARTHELOW M. RANDOLPH.

Witnesses:
 A. W. FRATER,
 G. S. FERNALD.